United States Patent [19]
Wörner

[11] 3,779,352
[45] Dec. 18, 1973

[54] BLOCKING SYNCHRONIZING ARRANGEMENT FOR MOTOR VEHICLE CHANGE-SPEED GEARS

[75] Inventor: Günter Wörner, Rommelshausen, Germany

[73] Assignee: Daimler-Benz Aktiengesellschaft, Stuggart-Unterturkheim, Germany

[22] Filed: Dec. 15, 1971

[21] Appl. No.: 208,216

[30] Foreign Application Priority Data
Dec. 15, 1970 Germany.................. P 20 61 621.1

[52] U.S. Cl.............. 192/53 F, 192/108, 192/114 T
[51] Int. Cl............................................. F16d 23/06
[58] Field of Search...................... 192/53 F, 114 T, 192/108

[56] References Cited
UNITED STATES PATENTS
| | | | |
|---|---|---|---|
| 3,620,338 | 11/1971 | Tomita et al. | 192/53 F |
| 3,175,412 | 3/1965 | Peras | 192/53 F X |
| 3,035,674 | 5/1962 | Peras | 192/53 F |
| 3,537,558 | 11/1970 | Bibbens | 192/114 T |

FOREIGN PATENTS OR APPLICATIONS
1,036,472   4/1953   France.............................. 192/53 F

*Primary Examiner*—Allan D. Herrmann
*Attorney*—Craig, Antonelli & Hill

[57] ABSTRACT

A blocking synchronization for motor vehicle change-speed transmissions, in which an axially displaceable shifting sleeve cooperates with synchronizing rings that are also axially displaceable and rotatable within limits; the synchronizing rings, in their turn, cooperate by means of blocking surfaces with the engaging tooth system at the gear whereby the blocking teeth at the synchronizing ring and at the gear are separate in effect from the engaging tooth system at the shifting sleeve and at the gear while the shifting sleeve in its engaged position abuts axially at an abutment of the gear whereas the synchronizing ring is free in such position.

10 Claims, 5 Drawing Figures

BLOCKING SYNCHRONIZING ARRANGEMENT FOR MOTOR VEHICLE CHANGE-SPEED GEARS

The present invention relates to a blocking synchronization for motor vehicle change-speed transmissions, in which an axially displaceable shifting sleeve cooperates with synchronizing rings also axially displaceable and limitedly rotatable which, in their turn, cooperate by means of blocking surfaces with the engaging teeth at the gear.

With blocking synchronizations of the aforementioned type, there exists the problem to limit permanently the shifting path of the shifting sleeve to a value, predetermined once and for all, and to relieve the synchronizing ring in the engaging position as regards forces. This cannot be attained with the known, prior art blocking synchronizations because in these prior art installations the synchronizing ring itself serves as limit means in the engaged position, i.e., abuts at the gear body or the like. The synchronizing ring is thereby under the influence of the axial forces acting on the shifting sleeve which stem from the undercut engaging teeth. The shifting path therefore does not remain constant with these prior art arrangements because the wear at the friction surfaces of the synchronizing ring and/or of the shifting sleeve product respectively different axial paths.

The present invention is concerned with the task to provide an effective solution to this problem. It solves the underlying problem with the aforementioned blocking synchronizations in that the blocking teeth at the synchronizing ring and at the gear part are effectively separated from the engaging teeth at the shifting sleeve and at the gear part and in that the shifting sleeve in its engaging position abuts axially against an abutment at the gear part whereas the synchronizing ring is free.

In the blocking synchronization according to the present invention, the blocking function, with the associated parts and the engaging function with the associated parts are arranged effectively in parallel, so to speak of, so that, in the first place, space is economized in the axial direction. Additionally, the wear at the friction surfaces is no longer a factor in the shifting path.

The shifting path, instead, is predetermined once and for all by the fixed abutment at the gear body. In the engaging position, the synchronizing ring is additionally free and relieved of loads stemming from the shifting sleeve and is exclusively under the influence of its return spring.

In one embodiment according to the present invention, the abutment is constituted by an annular shoulder at the gear part whose outer diameter corresponds to that of the engaging teeth at the gear part. According to a further feature of the present invention, this annular shoulder is constituted by the flank facing the shifting sleeve of an annular groove at the gear part forming simultaneously the termination for the engaging teeth.

Accordingly, it is an object of the present invention to provide a blocking synchronization for motor vehicle change-speed gears which avoids by simple means the aforementioned shortcomings and drawbacks encountered in the prior art.

Another object of the present invention resides in a blocking synchronization for motor vehicle change-speed transmissions in which the shifting travel of the shifting sleeve is determined once and for all by the design of the parts.

A further object of the present invention resides in a blocking synchronization mechanism for change-speed gears in which the shifting path of the shifting sleeve is essentially unaffected by wear in other parts of the synchronization while the synchronizing rings are relieved in the engaging position from forces stemming from the shifting sleeve.

A still further object of the present invention resides in a blocking synchronization for motor vehicle change-speed transmissions which is compact in the axial direction and eliminates the interaction of wear at the friction surfaces thereof on the shifting path of the mechanism.

These and other objects, features and advantages of the present invention will become more apparent from the following description when taken in connection with the accompanying drawing which shows, for purposes of illustration only, one embodiment in accordance with the present invention, and wherein.

Figure 1:
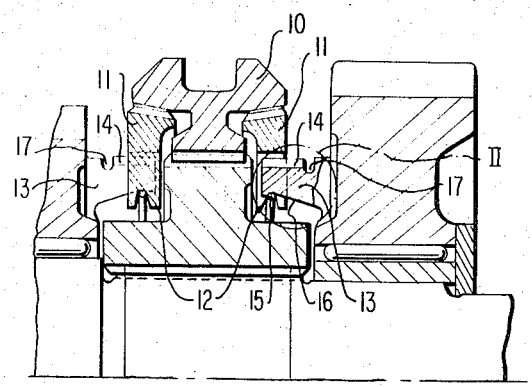
FIG. 1 is a partial longitudinal axial cross-sectional view through a blocking symchronization for a motor vehicle change-speed transmission in accordance with the present invention.
Figure 2:
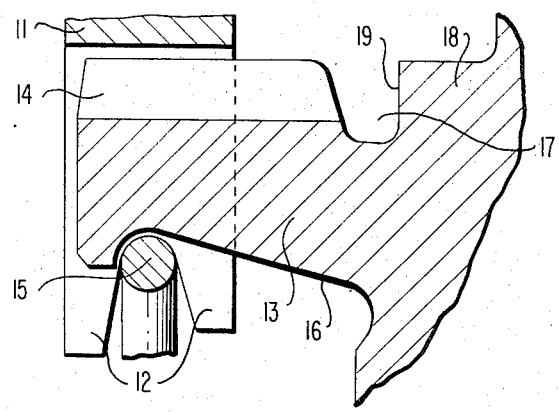
FIG. 2 is a partial cross-sectional view, on an enlarged scale, indicating the details of FIG. 1 which are encircled in dash and dot lines designated by II.

Referring now to the drawing wherein like reference numerals are used throughout the various views to designate like parts, and more particularly to FIGS. 1 and 2, the shifting sleeve 10 cooperates in a conventional manner with two synchronizing rings 11 which engage with inwardly projecting extensions 12 in corresponding apertures or cut-outs at the gear rim 13. This gear rim 13 is constituted by the gears disposed to both sides of the shifting sleeve and carries the engaging teeth 14. The extensions 12 of the synchronizing ring 11 receive inwardly thereof an annular spring 15 which cooperates with an inclined surface 16 at the gear rim 13.

Figure 3:
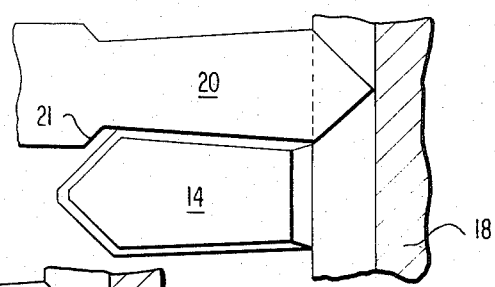
FIG. 3 is a somewhat schematic view of the engaging tooth arrangement at the shifting sleeve and gear part in the engaging position.

An annular groove 17 is cut in externally into the gear rim 13, which forms the termination for the engaging tooth system 14. In this manner, an annular shoulder 18 remains (see especially FIG. 2) whose flank 19 facing the shifting sleeve 10 forms an abutment for the tooth system 20 at the shifting sleeve 10 (FIG. 3). Corresponding abutments do not exist for the synchronizing ring 11, since the synchronizing ring is forcelockingly connected with the gear rim 13 by way of its radial extension 12. The synchronizing ring 11 is instead free in its axial movement in the direction toward the gear since shoulder 18 does not constitute an abutment therefor with its flank 19.

Figure 4:
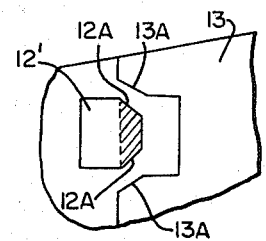
FIG. 4 is a detailed schematic cross-sectional view, taken in the radial direction, showing interengageable blocking surface means at the gear and synchronizing ring.

The extensions 12 at the synchronizing ring 11 as well as the corresponding apertures in the gear rim 13 include the usual blocking surfaces 12A and 13A shown schematically in FIG. 4 which, however, in the present invention are separated functionally from the engaging tooth system 14 and 20 and are disposed in parallel with respect thereto, so to speak of. In this manner, during the engagement of a speed, the synchronizing ring 11 is pushed by the shifting sleeve 10 in front thereof as usual, however, constructively only the axial extent of the blocking surfaces themselves have to be taken in consideration in connection therewith.

According to FIG. 3, the engaging tooth system 14 at the gear 13 as well as the engaging tooth system 20 at the shifting sleeve 10 are undercut in the usual manner in order to prevent a jumping out of the speed. An axial thrust results in this manner on the shifting sleeve 10 in the engaging direction, i.e., in the direction toward the gear 13. This axial force is absorbed by the flank 19 of the annular shoulder 18 against which abuts the teeth 20 provided on the shifting sleeve 10. Since no wear occurs in connection therewith, the predetermined shifting path remains preserved. The synchronizing ring therefore no longer forms the abutment, i.e., it is free in the engaged position and is exclusively under the effect of the ring spring 15.

Figure 3A:
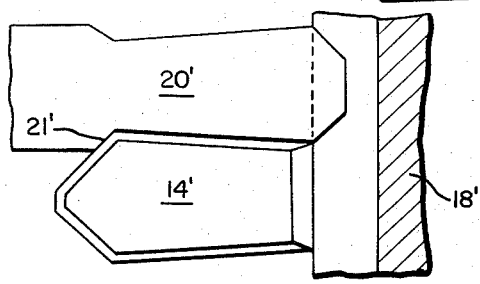
FIG. 3A is a view similar to FIG. 3 illustrating a modified embodiment of the invention.

Of course, the possibility also exists to realize this abutment effect in another manner. Thus, for example, the shoulders 21' at the engaging teeth 20' may also form the abutment as shown in FIG. 3A where primed reference numerals are used for corresponding features of the FIG. 3 embodiment.

In operation, when sleeve 10 is shifted axially, the synchronizing ring 11 is pushed in the same direction to more securely rotatably block the ring 11 and gear 13 by way of the blocking surfaces 12A and 13A illustrated in FIG. 4. The outer conical surfaces of the ring 11 serve to sunchronizingly transmit rotative forces from the sleeve 10 to the gear 13 until the gear 13 is rotating at the same speed as sleeve 10, at which time the teeth 20 and 14 interengage and sleeve 10 is permitted to move to its end position against abutments 19 or 21. Since ring 11 does not serve as an axial limit stop for the sleeve 10, ring 11 can then move relatively freely in the axial direction once the sleeve 10 and gear 13 are securely interengaged. See U.S. Pat. No. 3,035,674 to Peras for a similarly operating device which differs from the present invention by not providing axial stop abutments 19 or 21 such that synchronizing ring serves as the stop with the consequent disadvantages described in the introduction to the present specification.

While I have shown and described only one embodiment in accordance with the present invention, it is understood that the same is not limited thereto but is susceptible of numerous changes and modifications as are known to those skilled in the art, and I therefore do not wish to be limited to the details shown and described herein but intend to cover all such changes and modifications as are encompassed by the scope of the appended claims.

What I claim is:
1. A synchronizing mechanism comprising:
a gear having gear teeth means and gear blocking surface means,
a shifting sleeve having sleeve teeth means, said shifting sleeve being axially displaceable between a first non-engaged position with said sleeve teeth means out of engagement with said gear teeth means and a second engaged position with said sleeve teeth means drivingly engaged with said gear teeth means,
synchronizing ring means interposed between said gear and shifting sleeve and being axially shiftable by said shifting sleeve during movement of said shifting sleeve from said first position to said second position, said synchronizing ring means including a friction surface engageable with a corresponding friction surface on said shifting sleeve to synchronizingly transfer rotative forces from said shifting sleeve to said synchronizing ring means and synchronizing ring blocking surface means interengaged with circumferential play with said gear blocking surface means to rotatably lock said synchronizing sleeve and gear to one another during said movement of said shifting sleeve to said second position, the gear teeth means and gear blocking surface means being separated from one another such that the operative interconnection between the shifting sleeve and gear is independent of the operative interconnection between the gear and the synchronizing ring means whereby said synchronizing ring means can move axially independently of said shifting sleeve when said shifting sleeve is in said second position,
and abutment means provided on said gear for limiting axial movement of said shifting sleeve in the directio4n toward said second position such that said synchronizing ring means is relatively free of axial forces when said shifting sleeve is in said second position, whereby wear on said synchronizing ring is substantially limited and whereby any wear in the axial direction on said synchronizing ring does not affect the axial distance moved by said shifting sleeve between said first and second position.

2. A mechanism according to claim 1, characterized in that the abutment means is constituted by an annular shoulder at the gear, whose outer diameter corresponds substantially to that of the gear teeth means.

3. A mechanism according to claim 2, characterized in that the annular shoulder is constituted by a flank facing the shifting sleeve of an annular groove provided in the gear, which forms simultaneously the end of the gear teeth means.

4. A mechanism according to claim 3, characterized in that said gear blocking surface means are formed by apertures provided in a gear rim, said gear rim being provided with said gear teeth means at positions spaced from said apertures, and in that said synchronizing ring blocking surface means are formed by axially extending protrusions engageable in said apertures.

5. A mechanism according to claim 3, characterized in that the sleeve teeth means and the gear teeth means are undercut to prevent unintentional disengagement of a corresponding speed by producing an axial force on the shifting sleeve in the engaging direction.

6. A mechanism according to claim 5, characterized in that the axial force on the shifting sleeve is absorbed by the flank of said annular groove.

7. A mechanism according to claim 6, characterized in that said gear blocking surface means are formed by apertures provided in a gear rim, said gear rim being provided with said gear teeth means at positions spaced from said apertures, and in that said synchronizing ring blocking surface means are formed by axially extending protrusions engageale in said apertures.

8. A mechanism according to claim 1, characterized in that the sleeve teeth means and the gear teeth means are undercut to prevent unintentional disengagement of a corresponding speed by producing an axial force on the shifting sleeve in the engaging direction.

9. A mechanism according to claim 8, characterized in that shoulders formed by the undercut at the sleeve teeth means form said abutment means.

10. A mechanism according to claim 1 characterized in that said gear blocking surface means are formed by apertures provided in a gear rim, said gear rim being provided with said gear teeth means at positions spaced from said apertures, and in that said synchronizing ring blocking surface means are formed by axially extending protrusions engageable in said apertures.

* * * * *